(12) United States Patent
Kibayashi

(10) Patent No.: US 12,198,445 B2
(45) Date of Patent: Jan. 14, 2025

(54) DRIVE ASSIST DEVICE, DRIVE ASSIST METHOD, AND PROGRAM

(71) Applicant: HONDA MOTOR CO., LTD., Tokyo (JP)

(72) Inventor: Takeshi Kibayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 17/674,869

(22) Filed: Feb. 18, 2022

(65) Prior Publication Data

US 2022/0292847 A1  Sep. 15, 2022

(30) Foreign Application Priority Data

Mar. 11, 2021  (JP) ................................ 2021-039207

(51) Int. Cl.
*G06V 20/56* (2022.01)
*G06V 20/58* (2022.01)
*G08G 1/0962* (2006.01)

(52) U.S. Cl.
CPC .......... *G06V 20/588* (2022.01); *G06V 20/584* (2022.01); *G08G 1/09626* (2013.01)

(58) Field of Classification Search
CPC ............... G06V 20/588; G06V 20/584; G08G 1/09626; G08G 1/09623; B60W 30/18163; B60W 2552/53; G06T 2207/30256; G01C 21/3658
See application file for complete search history.

(56) References Cited

U.S. PATENT DOCUMENTS

2021/0163035 A1*  6/2021  Tezuka ............ B60W 30/18054

FOREIGN PATENT DOCUMENTS

JP  2018-025898  2/2018

* cited by examiner

*Primary Examiner* — Matthew C Bella
*Assistant Examiner* — Janice E. Vaz
(74) *Attorney, Agent, or Firm* — Amin, Turocy & Watson, LLP

(57) ABSTRACT

A drive assist device includes: a marking recognition unit configured to recognize a road marking on a driving lane and a road marking on a first adjacent lane from an image of a pavement captured from a vehicle and specify a permitted travel direction of the driving lane and a permitted travel direction of the first adjacent lane; a detection unit configured to detect a lane change performed by the vehicle; and an information management unit configured to cause a storage unit to store first information indicating the permitted travel direction of the driving lane and second information indicating the permitted travel direction of the first adjacent lane specified by the marking recognition unit, and in a case in which the detection unit detects the lane change to the first adjacent lane, update the information stored in the storage unit to change the second information as the permitted travel direction of the driving lane and the first information as the permitted travel direction of a second adjacent lane.

8 Claims, 17 Drawing Sheets

FIG. 4

| POINT | | (A) | (B) | (C) |
|---|---|---|---|---|
| LEFT-HAND LANE | LEFT TURN | ◯ | ◯ | ◯ |
| | STRAIGHT | ◯ | ◯ | ◯ |
| | RIGHT TURN | × | × | × |
| DRIVING LANE | LEFT TURN | × | × | × |
| | STRAIGHT | ◯ | ◯ | ◯ |
| | RIGHT TURN | ◯ | ◯ | × |
| RIGHT-HAND LANE | LEFT TURN | ◯ (NOT DETECTED) | ◯ | × |
| | STRAIGHT | ◯ (NOT DETECTED) | ◯ | × |
| | RIGHT TURN | ◯ (NOT DETECTED) | ◯ | ◯ |

FIG. 6

| POINT | | (D) | (E) |
|---|---|---|---|
| LEFT-HAND LANE | LEFT TURN | ◯ | ◯ (NOT DETECTED) |
| | STRAIGHT | ◯ | ◯ (NOT DETECTED) |
| | RIGHT TURN | × | ◯ (NOT DETECTED) |
| DRIVING LANE | LEFT TURN | × | ◯ |
| | STRAIGHT | ◯ | ◯ |
| | RIGHT TURN | ◯ | × |
| RIGHT-HAND LANE | LEFT TURN | ◯ (NOT DETECTED) | × |
| | STRAIGHT | ◯ (NOT DETECTED) | ◯ |
| | RIGHT TURN | ◯ (NOT DETECTED) | ◯ |

FIG. 9

| POINT | | (F), (H) | (G), (I) |
|---|---|---|---|
| LEFT-HAND LANE | LEFT TURN | ○ (NOT DETECTED) | ○ (NOT DETECTED) |
| | STRAIGHT | ○ (NOT DETECTED) | ○ (NOT DETECTED) |
| | RIGHT TURN | ○ (NOT DETECTED) | ○ (NOT DETECTED) |
| DRIVING LANE | LEFT TURN | ○ | ○ (NOT DETECTED) |
| | STRAIGHT | ○ | ○ (NOT DETECTED) |
| | RIGHT TURN | × | ○ (NOT DETECTED) |
| RIGHT-HAND LANE | LEFT TURN | × | ○ (NOT DETECTED) |
| | STRAIGHT | ○ | ○ (NOT DETECTED) |
| | RIGHT TURN | ○ | ○ (NOT DETECTED) |

FIG. 12

| POINT | | (J) | (K) |
|---|---|---|---|
| LEFT-HAND LANE | LEFT TURN | ○ | ○ |
| | STRAIGHT | ○ | ○ |
| | RIGHT TURN | × | × |
| DRIVING LANE | LEFT TURN | × | × |
| | STRAIGHT | ○ | ○ |
| | RIGHT TURN | × | × |
| RIGHT-HAND LANE | LEFT TURN | × | × |
| | STRAIGHT | × | × |
| | RIGHT TURN | ○ | ○ |

| POINT | | (M) | (N) |
|---|---|---|---|
| LEFT-HAND LANE | LEFT TURN | ○ (NOT DETECTED) | ○ (NOT DETECTED) |
| | STRAIGHT | ○ (NOT DETECTED) | ○ (NOT DETECTED) |
| | RIGHT TURN | ○ (NOT DETECTED) | ○ (NOT DETECTED) |
| DRIVING LANE | LEFT TURN | × | ○ (NOT DETECTED) |
| | STRAIGHT | × | ○ (NOT DETECTED) |
| | RIGHT TURN | ○ | ○ (NOT DETECTED) |
| RIGHT-HAND LANE | LEFT TURN | ○ (NOT DETECTED) | × |
| | STRAIGHT | ○ (NOT DETECTED) | × |
| | RIGHT TURN | ○ (NOT DETECTED) | ○ |

DRIVE ASSIST DEVICE, DRIVE ASSIST METHOD, AND PROGRAM

CROSS-REFERENCE TO RELATED APPLICATION

Priority is claimed on Japanese Patent Application No. 2021-039207, filed on Mar. 11, 2021, the contents of which are incorporated herein by reference.

BACKGROUND

Field of the Invention

The present invention relates to a drive assist device, a drive assist method, and a program.

Background

For vehicle control technologies for performing vehicle drive assist and automatic driving, it is important to accurately recognize pavement markings such as road markings and lane lines, road signs, and traffic signals. In the related art, there are technologies for improving recognition accuracy by taking the travel environment, such as that of an expressway or a general road, into consideration when pavement markings and road signs are recognized from images captured during travel (see Japanese Unexamined Patent Application, First Publication No. 2018-25898, for example).

SUMMARY

However, according to the aforementioned related art, it is necessary to recognize road markings again in a case in which a travel lane is changed by a vehicle changing a lane, for example. Therefore, there is a possibility that a vehicle will be traveling in a state where road markings are not recognized in many cases. In this manner, there is a possibility that it will not be able to perform appropriate drive assist for passengers according to the aforementioned related art.

An object of one aspect of the present invention is to provide a drive assist device, a drive assist method, and a program capable of performing appropriate drive assist.

A drive assist device according to a first aspect of the invention is a drive assist device including: a marking recognition unit configured to recognize a road marking on a driving lane and a road marking on a first adjacent lane from an image of the pavement captured from a vehicle and specify a permitted travel direction of the driving lane and a permitted travel direction of the first adjacent lane; a detection unit configured to detect a lane change performed by the vehicle; and an information management unit configured to cause a storage unit to store first information indicating the permitted travel direction of the driving lane and second information indicating the permitted travel direction of the first adjacent lane specified by the marking recognition unit, and in a case in which the detection unit detects the lane change to the first adjacent lane, update the information stored in the storage unit to change the second information as the permitted travel direction of the driving lane and the first information as the permitted travel direction of a second adjacent lane.

A second aspect is the drive assist device according to the first aspect described above, wherein the marking recognition unit may further recognize a permitted travel direction of the second adjacent lane and further specify the permitted travel direction of the second adjacent lane, and the information management unit may further cause the storage unit to store third information indicating the permitted travel direction of the second adjacent lane recognized by the marking recognition unit, and in a case in which the detection unit detects the lane change to the first adjacent lane, invalidate the third information stored in the information management unit.

A third aspect is the drive assist device according to the first or second aspect described above, wherein in a case in which there is a lane with no road marking recognized by the marking recognition unit, the information management unit may regard a permitted travel direction of the lane as being the same as a permitted travel direction of the lane based on information stored in the storage unit immediately before and regard a road marking indicating the permitted travel direction of the lane as having been recognized at a point where the road marking of the lane has not been recognized.

A fourth aspect is the drive assist device according to any one of the first to third aspects described above which may further include a determination unit configured to determine whether or not a condition that any of right or left turn, passing through an intersection, or travel of a predetermined distance after the marking recognition unit recognizes the permitted travel direction by the vehicle is done is satisfied, and the information management unit may invalidate the information indicating the permitted travel direction stored in the storage unit in a case in which the determination unit determines that the condition is satisfied.

A fifth aspect is the drive assist device according to any one of the first to fourth aspects described above which may further include: a signal state recognition unit configured to recognize a display state of a traffic signal and specify a permitted travel direction; and a notification unit configured to provide a notification to a passenger of the vehicle in a case in which the permitted travel direction recognized by the signal state recognition unit does not conform to the permitted travel direction of the driving lane based on the information stored in the storage unit.

A sixth aspect is the drive assist device according to any one of the first to fifth aspects described above which may further include: a lane recognition unit configured to specify the driving lane and the adjacent lane based on a lane line recognized from the image; and an interpolation unit configured to interpolate the lane line that has not been recognized, if any, with a lane line estimated with reference to a travel direction of the vehicle.

A seventh aspect is the drive assist device according to the sixth aspect described above, wherein in a case in which the permitted travel direction of the driving lane specified based on the estimated lane line conforms to a permitted travel direction of the adjacent lane based on a road marking recognized from a new image, the information management unit may invalidate the information indicating the permitted travel direction of the driving lane stored in the storage unit.

A drive assist method according to an eighth aspect of the invention is a drive assist method including, by a computer: recognizing a road marking on a driving lane and a road marking on a first adjacent lane from an image of a pavement captured from a vehicle and specifying a permitted travel direction of the driving lane and a permitted travel direction of the first adjacent lane; detecting a lane change performed by the vehicle; and causing a storage unit to store first information indicating the permitted travel direction of the driving lane and second information indicating the permitted travel direction of the first adjacent lane, and in a case in which the lane change to the first adjacent lane is detected, updating the information stored in the storage unit to change the second information as the permitted travel direction of the driving lane and the first information as the permitted travel direction of a second adjacent lane.

A ninth aspect of the invention is a computer-readable non-transitory recording medium including a program that causes a computer to: recognize a road marking on a driving lane and a road marking on a first adjacent lane from an image of a pavement captured from a vehicle and specify a permitted travel direction of the driving lane and a permitted travel direction of the first adjacent lane; detect a lane change performed by the vehicle; and cause a storage unit to store first information indicating the permitted travel direction of the driving lane and second information indicating the permitted travel direction of the first adjacent lane, and in a case in which the lane change to the first adjacent lane is detected, update the information stored in the storage unit to change the second information as the permitted travel direction of the driving lane and the first information as the permitted travel direction of a second adjacent lane.

According to the first to ninth aspects, it is possible to perform more appropriate drive assist.

BRIEF DESCRIPTION OF THE DRAWINGS

FIG. 4 is a diagram for explaining the drive assist control performed by the recognition unit.

FIG. 6 is a diagram for explaining the processing performed by the recognition unit in the first drive assist pattern.

FIG. 9 is a diagram for explaining the processing performed by the recognition unit in the first drive assist pattern.

FIG. 12 is a diagram for explaining the processing performed by the recognition unit in the second drive assist pattern.

DESCRIPTION OF EMBODIMENTS

Hereinafter, embodiments of a drive assist device, a drive assist method, and a program according to the invention will be described with reference to the drawings. A drive assist device according to an embodiment is mounted in an automatic driving vehicle. The drive assist device according to the embodiment is a device that assists vehicle drive control. The drive control mentioned here is, for example, control for causing a vehicle to move to an appropriate lane in accordance with a desired travel direction and control for causing the vehicle to appropriately start and stop in accordance with the lane along which the vehicle is traveling and display states of traffic signals. The drive assist device according to the embodiment assists vehicle drive control by managing information related to lanes and road markings, for example, and providing the information to other devices. For example, the drive assist device according to the embodiment appropriately provides the information related to the lanes, the road markings, and the like to a map positioning unit (MPU) for determining a recommended lane in accordance with a travel route considered by a navigation system. In this manner, the drive assist device according to the embodiment can secure a lane selection by the MPU.

However, the vehicle in which the drive assist device according to the embodiment of the invention is mounted is not limited to an automatic driving vehicle and may be a vehicle that requires manual driving operations by a driver. Note that in the vehicle that requires manual driving operations by a driver, the drive assist device according to the invention appropriately provides the information related to the lanes and the road markings to a human machine interface (HMI) that provides information to a passenger, for example. In this manner, the drive assist device according to the embodiment of the invention can cause the HMI to provide a notification to the passenger in a case where a direction in which the vehicle can travel in the lane where the vehicle is traveling is different from a direction indicated by an indicator, for example.

Overall Configuration

Figure 1:
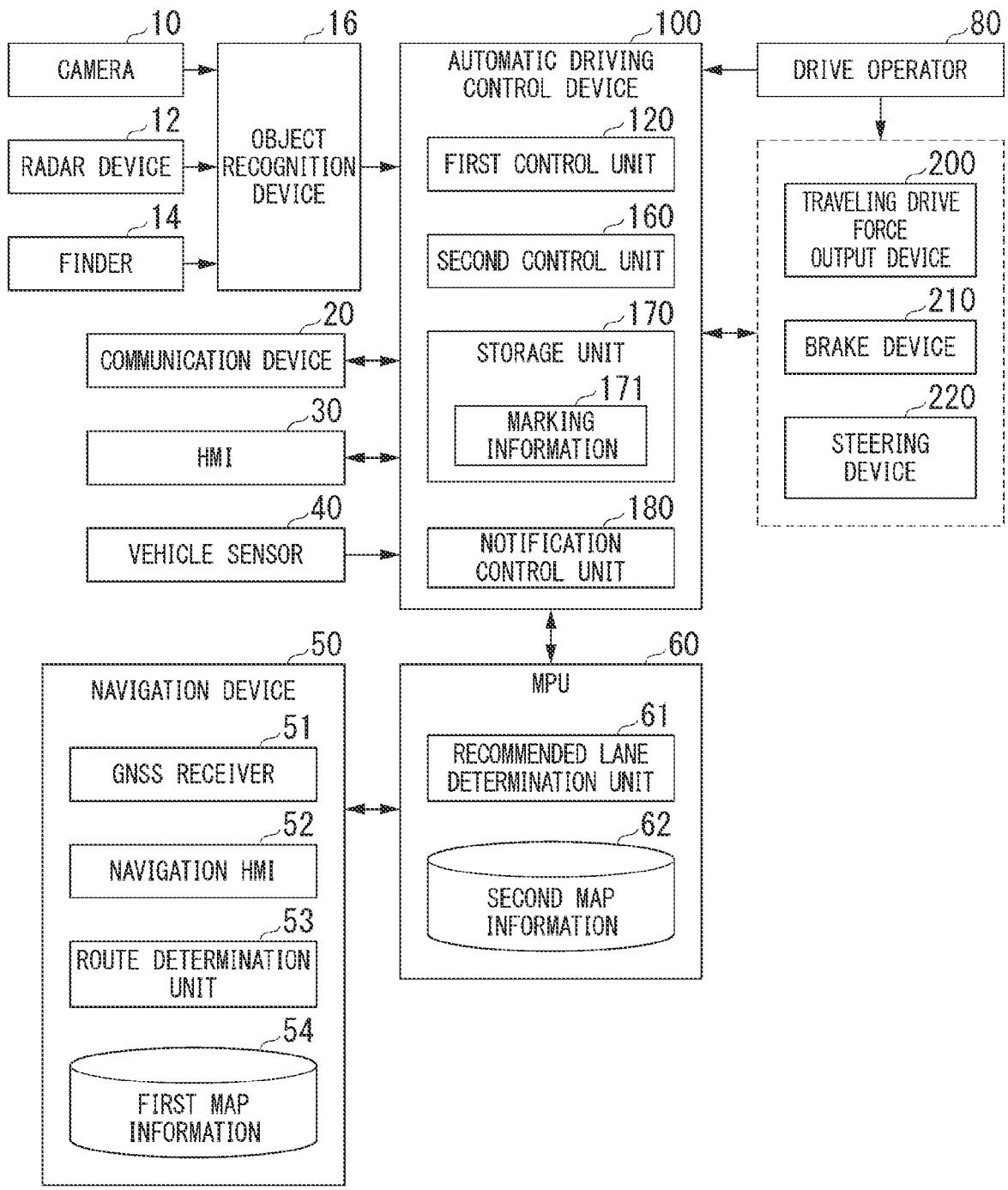
FIG. 1 is a configuration diagram of a vehicle system using a drive assist device according to an embodiment.

FIG. 1 is a configuration diagram of a vehicle system 1 using a drive assist device according to a first embodiment. A vehicle in which the vehicle system 1 is mounted (hereinafter, referred to as a "vehicle M") is a two-wheeled, three-wheeled, or four-wheeled vehicle, for example, and a drive source thereof is an internal combustion engine such as a diesel engine or a gasoline engine, an electric motor, or a combination thereof. The electric motor operates using power generated by a power generator coupled to the internal combustion engine or power discharged by a secondary battery or a fuel battery.

The vehicle system 1 includes, for example, a camera 10, a radar device 12, a finder 14, an object recognition device 16, a communication device 20, an HMI 30, a vehicle sensor 40, a navigation device 50, an MPU 60, a drive operator 80, an automatic driving control device 100, a traveling drive force output device 200, a brake device 210, and a steering device 220. Note that the automatic driving control device 100 is an example of the "drive assist device". These devices and machines are connected to each other via a multiplex communication line such as a controller area network (CAN), a serial communication line, a wireless communication network, or the like. Note that the configuration illustrated in FIG. 1 is just an example, and some of the configurations may be omitted, or different configurations may further be added.

The camera 10 is a digital camera using a solid imaging element such as a charge coupled device (CCD) or a complementary metal oxide semiconductor (CMOS), for example. The camera 10 is attached to an arbitrary location of the vehicle M. In a case in which a front side of the vehicle M is imaged, for example, the camera 10 is attached to an upper portion of a front wind shield, a back surface of a rear-view mirror, or the like. In a case in which a back side of the vehicle M is imaged, the camera 10 is attached to an upper portion of a rear wind shield or the like. In a case in which a right side or a left side of the vehicle M is imaged, the camera 10 is attached to a right side surface, a left side surface, or the like of a vehicle body or a door mirror. The camera 10 periodically and repeatedly images the surroundings of the vehicle M, for example. The camera 10 may be a stereo camera.

Also, the camera 10 can image a pavement when the vehicle M is traveling and stopping. The camera 10 images the pavement in front of the vehicle M, for example. The camera 10 captures an image such that a travel lane along which the vehicle M is traveling (hereinafter, referred to as a "driving lane") and other travel lanes that are present in parallel with the driving lane (hereinafter, referred to as "other lanes") are included in the captured image, for example. Other lanes descried here include at least other lanes that are adjacent to and in parallel with the driving lane (hereinafter, referred to as "adjacent lanes").

Also, the camera 10 can image a traffic signal (a traffic signal for vehicles) when the vehicle M is traveling and stopping. The camera 10 images the traffic sign by imaging a slightly upper side of a front side of the vehicle M, for example. The camera 10 captures the image such that a three-light signal and an arrow signal of the traffic signal are included in the captured image, for example.

The radar device 12 emits radio waves such as millimeter waves to the surroundings of the vehicle M, detects radio waves (reflected waves) reflected by an object and detects at least the position (the distance and the azimuth) of the object. The radar device 12 is attached to an arbitrary location of the vehicle M. The radar device 12 may detect the position and the speed of the object by a frequency modulated continuous wave (FM-CW) scheme.

The finder 14 is a light detection and ranging (LIDAR). The finder 14 emits light to the surroundings of the vehicle M and measures scattered light. The finder 14 detects the distance to a target on the basis of a time from light emission to light reception. The emitted light is, for example, pulse-shaped laser light. The finder 14 is attached to an arbitrary location of the vehicle M.

The object recognition device 16 performs sensor fusion processing on results of detection performed by some or all of the camera 10, the radar device 12, and the finder 14 and recognizes the position, the type, the speed, and the like of an object. The object recognition device 16 outputs a result of the recognition to the automatic driving control device 100. The object recognition device 16 may output results of the detection of the camera 10, the radar device 12, and the finder 14 as they are to the automatic driving control device 100. The object recognition device 16 may be omitted from the vehicle system 1.

Also, the object recognition device 16 recognizes lane lines and road marking, for example, from an image captured by the camera 10. The object recognition device 16 recognizes, for example, a three-light signal and an arrow signal from the image captured by the camera 10.

The communication device 20 communicates with other vehicles that are present in the surroundings of the vehicle M using a cellular network, a Wi-Fi network, Bluetooth (registered trademark), or a dedicated short range communication (DSRC), for example, or communicates with various server devices via a wireless base station.

The HMI 30 presents various kinds of information to a passenger (a driver, for example) of the vehicle M and receives an operation input by the passenger. The HMI 30 includes, for example, various display devices, a speaker, a buzzer, a touch panel, a switch, and a key.

The vehicle sensor 40 includes a vehicle speed sensor that detects a speed of the vehicle M, an acceleration sensor that detects acceleration, a yaw rate sensor that detects an angular speed around a vertical axis, an azimuth sensor that detects an orientation or a travel direction of the vehicle M, and the like. Various kinds of information detected by the vehicle sensor 40 are output to a navigation device 50 or an automatic driving control device 100, for example.

The navigation device 50 includes, for example, a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies the position of the vehicle M on the basis of a signal received from a GNSS satellite. The position of the vehicle M may be specified or complemented by an inertial navigation system (INS) using outputs of the vehicle sensor 40. The navigation HMI 52 includes a display device, a speaker, a touch panel, a key, and the like. The navigation HMI 52 may commonly use a part or entirety of the aforementioned HMI 30. The route determination unit 53 determines a route (hereinafter, referred to as a route on the map) from the position of the vehicle M specified by the GNSS receiver 51 (or an input arbitrary position) to a destination input by the passenger using the navigation HMI 52 with reference to the first map information 54. The first map information 54 is information in which road shapes are expressed by links indicating roads and nodes connected by the links, for example. The first map information 54 may include curvatures of roads, point-of-interest (POI) information, and the like. The route on the map is output to the MPU 60. The navigation device 50 may perform route guidance using the navigation HMI 52 on the basis of the route on the map. The navigation device 50 may be realized by functions of a terminal device such as a smartphone, or a tablet owned by the passenger, for example. The navigation device 50 may transmit a current position and a destination to a navigation server via the communication device 20 and acquire a route equivalent to the route on the map from the navigation server.

The MPU 60 includes, for example, a recommended lane determination unit 61 and holds second map information 62 in a storage device such as an HDD or a flash memory. The recommended lane determination unit 61 splits the route on the map provided from the navigation device 50 into a plurality of blocks (split it into every 100 [m] in the vehicle travel direction, for example) and determines a recommended lane for each block with reference to the second map information 62. The recommended lane determination unit 61 determines what number of lane from the left the vehicle is to travel. In a case in which a junction location is present on the route in the map, the recommended lane determination unit 61 determines the recommended lane such that the vehicle M can travel along a reasonable route for traveling after the junction.

The second map information 62 is more precise map information than the first map information 54. The second map information 62 includes, for example, information regarding centers of lanes and information regarding boundaries of the lanes. Also, the second map information 62 may include road information, traffic restriction information, address information (addresses and postal codes), facility information, phone number information, and the like. The second map information 62 may be updated as needed by the communication device 20 communicating with other devices.

The drive operator 80 includes, for example, an acceleration pedal, a brake pedal, a shift lever, a steering wheel, a deformed steering, a joystick, and other operators. A sensor that detects the amount of operation or whether or not an operation has been performed is attached to the drive operator 80, and a result of detection thereof is output to the automatic driving control device 100 or some or all of the traveling drive force output device 200, the brake device 210, and the steering device 220.

The automatic driving control device 100 (drive assist device) includes, for example, a first control unit 120, a second control unit 160, a storage unit 170, and a notification control unit 180. Each of the first control unit 120, the second control unit 160, and the notification control unit 180 is realized by a hardware processor such as a central processing unit (CPU), for example, executing a program (software). Also, some or all of these components may be realized by hardware (a circuit unit; including a circuitry) such as large scale integration (LSI), an application specific integrated circuit (ASIC), a field-programmable gate array (FPGA), a graphics processing unit (GPU) or the like or may be realized by cooperation of software and hardware. The program may be stored in a storage device (a storage device including a non-transitory storage medium) such as an HDD or a flash memory in the automatic driving control device 100 in advance, or may be stored in a detachable storage medium such as a DVD or a CD-ROM and installed in the HDD or the flash memory in the automatic driving control device 100 by the storage medium (non-transitory storage medium) being attached to a drive device.

Figure 2:
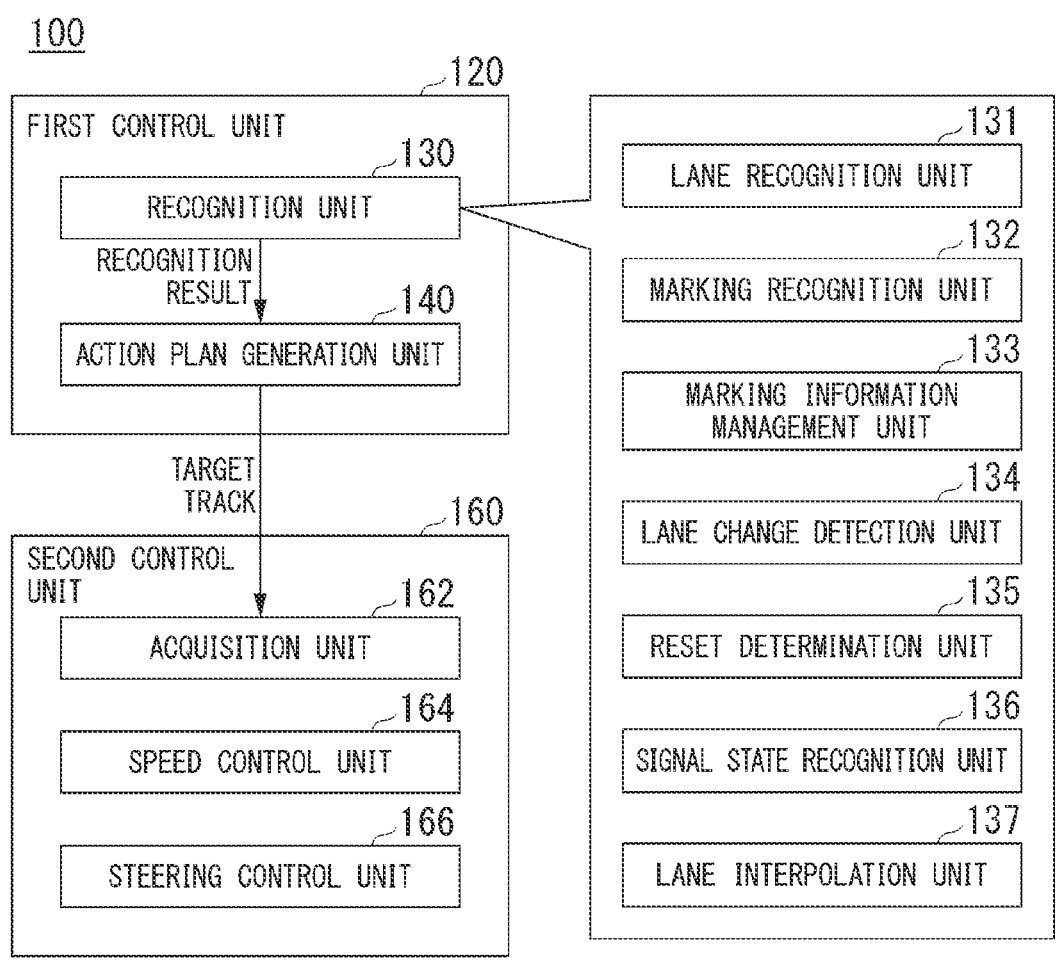
FIG. 2 is a functional configuration diagram of a first control unit and a second control unit.

FIG. 2 is a functional configuration diagram of the first control unit 120 and the second control unit 160. The first control unit 120 includes, for example, a recognition unit 130 and an action plan generation unit 140. The first control unit 120 realizes a function based on artificial intelligence (AI) and a function based on a model provided in advance in parallel, for example. For example, a function of "recognizing an intersection" may be realized by executing recognition of the intersection based on deep learning or the like and recognition based on conditions provided in advance (there are a pattern matching available signal, a road marking and the like) being executed in parallel and scoring and comprehensively evaluating both the recognition results. In this manner, reliability of the automatic driving is secured.

The recognition unit 130 recognizes an environment in the surroundings of the vehicle M. For example, the recognition unit 130 recognizes states such as positions, speed, acceleration, travel directions, and the like of objects (surrounding vehicles and targets, for example) in the surroundings of the vehicle M on the basis of information input from the camera 10, the radar device 12, and the finder 14 via the object recognition device 16. The positions of the objects are recognized as positions in an absolute coordinate system including a representative point (a center of gravity, a drive axis center, or the like) of the vehicle M as an origin, for example, and are used for control. The positions of the objects may be represented by representative points, such as centers of gravity, centers, or corners of the objects or may be represented as expressed regions. In a case in which the objects are vehicles, the "states" of the objects may include acceleration or jerks of the objects or "action states" (for example, whether the vehicles are changing lanes or trying to change lanes).

Also, the recognition unit 130 recognizes the lane on which the vehicle M travels and other lanes, for example. For example, the recognition unit 130 recognizes a travel lane by comparing patterns of lane lines (alignment of solid lines and broken lines, for example) obtained from the second map information 62 with patterns of lane lines in the surroundings of the vehicle M recognized from the image captured by the camera 10. Note that the recognition unit 130 may recognize the travel lane by recognizing not only the lane lines but also travel path boundaries (road boundaries) including lane lines, road shoulders, curbstones, median strips, and guard rails. In this recognition, the position of the vehicle M acquired from the navigation device 50 and a result of processing performed by the INS may be taken into consideration. Also, the recognition unit 130 recognizes a temporary stop line (hereinafter, referred to as a stop line), a traffic signal, an obstacle, a tollgate, and other road matters.

The recognition unit 130 recognizes the position and the posture of the vehicle M relative to the travel lane when the recognition unit 130 recognizes the travel lane. The recognition unit 130 may recognize separation of a reference point of the vehicle M from the center of the lane and an angle of the travel direction of the vehicle M relative to a line obtained by connecting centers of the lane as the relative position and the posture of the vehicle M relative to the travel lane, for example. Instead, the recognition unit 130 may recognize the position of the reference point of the vehicle M relative to any one of side end portions (a lane line or a road boundary) of the travel lane as the relative position of the vehicle M relative to the travel lane.

The recognition unit 130 recognizes information regarding the positions of the surrounding vehicles on the basis of the vehicles in the surroundings of the vehicle M recognized from the image captured by the camera 10, the image captured by the camera 10, information regarding a traffic jam in the surroundings of the vehicle M acquired by the navigation device 50, and position information obtained from the second map information 62.

Note that the recognition unit 130 may acquire, via the communication device 20, various kinds of information received from vehicles and the like traveling in the surroundings of the vehicle M through inter-vehicle communication and recognize the surroundings of the vehicle M on the basis of the information. Also, the recognition unit 130 includes, for example, a lane recognition unit 131, a marking recognition unit 132, a marking information management unit 133 (an example of the "information management unit"), a lane change detection unit 134 (an example of the "detection unit"), a reset determination unit 135 (an example of the "determination unit"), a signal state recognition unit 136, and a lane interpolation unit 137 (an example of the "interpolation unit"). Details of the function of the recognition unit 130 including these components will be described later.

The action plan generation unit 140 generates a target track along which the vehicle M will automatically (without operations of the driver) travel in the future such that the vehicle M can travel along the recommended lane determined by the recommended lane determination unit 61 in principle and to further address situations in the surroundings of the vehicle M. The target track includes, for example, a speed element. Fr example, the target track is expresses as points (track points), which the vehicle M is to reach, aligned in order. The track points are points that the vehicle M is to reach at every predetermined travel distance (several [m], for example) in terms of a distance along the road, and separately, a target speed and target acceleration for each predetermined sampling time (zero point every several fractions of a [sec], for example) are generated as parts of the target track. Each track point may be a position that the vehicle M is to reach at a sampling clock time for each predetermined sampling time. In this case, the information regarding the target speed and the target acceleration is expressed as intervals of the track points.

The action plan generation unit 140 may set automatic driving events when the target track is generated. The automatic driving events include, for example, a constant speed traveling event, a low speed following travel event, a lane change event, a junction event, a converging event, and a takeover event. The action plan generation unit 140 generates a target track in accordance with the activated events.

The second control unit 160 controls the traveling drive force output device 200, the brake device 210, and the steering device 220 such that the vehicle M passes through the target track generated by the action plan generation unit 140 at the clock time as scheduled.

The second control unit 160 includes, for example, an acquisition unit 162, a speed control unit 164, and a steering control unit 166. The acquisition unit 162 acquires information regarding the target track (track points) generated by the action plan generation unit 140 and causes a memory (not illustrated) to store the information. The speed control unit 164 controls the traveling drive force output device 200 or the brake device 210 on the basis of a speed element that accompanies the target track stored in the memory. The steering control unit 166 controls the steering device 220 in accordance with how the target track stored in the memory is curved. Processing of the speed control unit 164 and the steering control unit 166 is realized by, for example, a combination of feed forward control and feedback control, for example. In one example, the steering control unit 166 executes the feed forward control in accordance with a curvature of the road in front of the vehicle M and the feedback control based on separation from the target track.

The notification control unit 180 notifies the passenger of predetermined information using the HMI 30. Note that the notification control unit 180 and the HMI 30 are an example of the "notification unit". The predetermined information is, for example, information recognized by the recognition unit 130, a state of the automatic driving (drive assist) executed by the automatic driving control device 100, and other information regarding vehicle control. Also, the predetermined information may include information acquired by the navigation device 50 and information such as TV programs and content (movies, for example) stored in a storage medium such as a DVD. Also, the notification control unit 180 outputs the information received by the HMI 30 to the communication device 20, the navigation device 50, and the first control unit 120, for example.

The traveling drive force output device 200 outputs a travel drive force (torque) for the vehicle to travel to a driving wheel. The traveling drive force output device 200 includes, for example, a combination of an internal combustion engine, an electric motor, a transmission, and the like and an electronic control unit for controlling these components. The ECU may control the aforementioned configurations in accordance with information input from the second control unit 160 or information input from the drive operator 80.

The brake device 210 includes, for example, a brake caliper, a cylinder that transmits a hydraulic pressure to the brake caliper, an electric motor that generates a hydraulic pressure in a cylinder, and a brake ECU. The brake ECU controls the electric motor in accordance with information input from the second control unit 160 or information input from the drive operator 80 and causes a brake torque in accordance with a braking operation to be output to each wheel. The brake device 210 may include, as backup, a mechanism for transmitting a hydraulic pressure generated by an operation of the brake pedal included in the drive operator 80 to the cylinder via a master cylinder. Note that the brake device 210 is not limited to the configuration described above and may be an electronic control-type hydraulic brake device that controls an actuator in accordance with information input from the second control unit 160 and transmits a hydraulic pressure of the master cylinder to the cylinder.

The steering device 220 includes, for example, a steering ECU and an electric motor.

The electric motor causes a force to act on a rack-and-pinion mechanism to change the direction of a steered wheel, for example. The steering ECU drives the electric motor and causes the direction of the steered wheel to be changed in accordance with information input from the second control unit 160 or information input from the drive operator 80.

Hereinafter, functions of the recognition unit 130 according to the embodiment and details of drive assist control based on a result of recognition performed by the recognition unit 130 will be specifically described. In the following description, a drive assist control pattern for each situation will be described.

First Drive Assist Control Pattern

Figure 3:
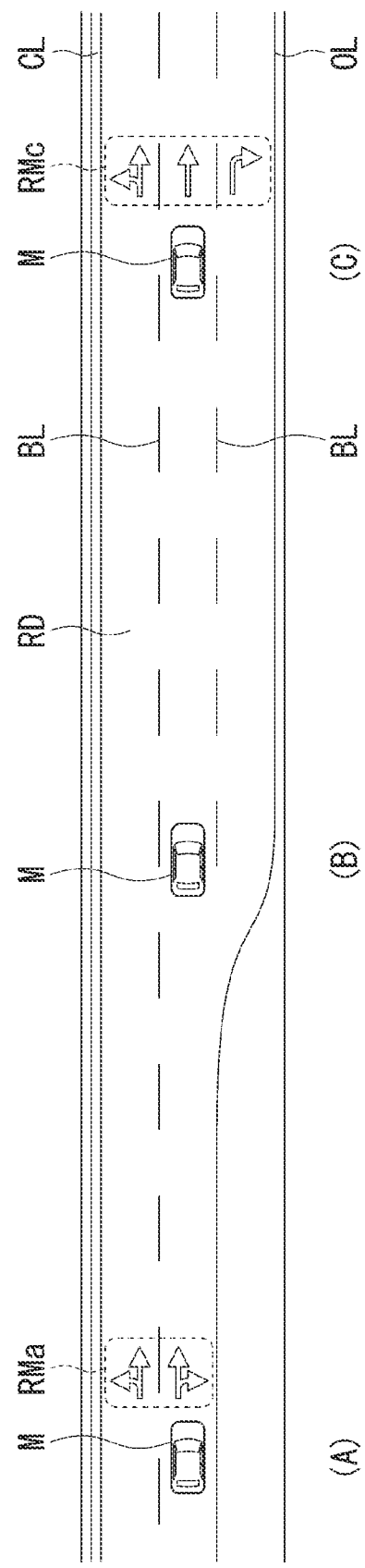
FIG. 3 is a diagram for explaining drive assist control performed by a recognition unit.

FIGS. 3 and 4 are diagrams for explaining drive control performed by the recognition unit 130. FIG. 3 illustrates a road RD, a lane center line CL, two lane boundary lines BL, a lane outer line OL, a road marking RMa displayed at a point A, and a road marking RMc displayed at a point C. Also, FIG. 3 illustrates the vehicle M that is about to pass through each of the point A, the point B, and the point C. In other words, FIG. 3 illustrates a state in which the vehicle M is traveling along the road RD while passing through the point A, the point B, and the point C in this order.

The lane recognition unit 131 of the automatic driving control device 100 mounted in the vehicle M recognizes a driving lane, an adjacent lane that is adjacent to the driving lane on the left side (hereinafter, referred to as a "left-hand lane"), and an adjacent lane that is adjacent to the driving lane on the right side (hereinafter, referred to as a "right-hand lane") on the basis of information output from the object recognition device 16. The information output from the object recognition device 16 mentioned here is information indicating the lane center line CL, the lane boundary lines BL, and the lane outer line OL recognized by the object recognition device 16 from an image of a pavement captured by the camera 10 from the vehicle M.

The marking recognition unit 132 of the automatic driving control device 100 mounted in the vehicle M recognizes a road marking displayed in each of the driving lane and the adjacent lanes on the basis of information output from the object recognition device 16. The marking recognition unit 132 specifies the direction in which traveling is permitted (hereinafter, referred to as a "permitted travel direction") of each of the driving lane and the adjacent lanes on the basis of the recognized road markings displayed in the driving lane and the adjacent lanes. The information output from the object recognition device 16 mentioned here is information indicating the road marking RMa and the road marking RMc recognized by the object recognition device 16 from the image of the pavement captured by the camera 10 from the vehicle M. As illustrated in FIG. 3, the road marking RMa and the road marking RMc include a road marking in the driving lane and a road marking in the adjacent lanes.

When the vehicle M is about to pass through the point A, the marking recognition unit 132 acquires information indicating the road marking RMa and recognizes the road marking in the driving lane and the road marking in the adjacent lane (left-hand lane).

The marking recognition unit 132 specifies that the permitted travel direction of the driving lane is a straight-ahead direction and a right turn direction while the permitted travel direction of the left-hand lane is the straight-ahead direction and a left turn direction on the basis of a result of the recognition. The marking recognition unit 132 outputs information indicating the result of the specification to the marking information management unit 133. The marking information management unit 133 acquires information output from the marking recognition unit 132. The marking information management unit 133 causes the storage unit 170 to store the acquired information as marking information 171.

FIG. 4 illustrates, in the form of a table, marking information 171 stored in the storage unit 170 at a timing at which the vehicle M passes through each point. As illustrated in FIG. 4, according to the marking information 171 at the point A, the permitted travel directions of the left-hand lane are the left turn direction and the straight-ahead direction while the permitted travel directions of the driving lane are the straight-ahead direction and the right turn direction. Note that since there is no right-hand lane at the point A as illustrated in FIG. 3 and no road marking on the right-hand lane are recognized, the permitted travel direction of the right-hand lane has not yet been detected in the marking information 171 at the point A as illustrated in FIG. 4. Note that in a case in which the permitted travel direction has not yet been detected, it is determined that the vehicle can travel in all directions.

The point B is a point at which a right-hand lane has been additionally added next to the driving lane on the right side. When the vehicle M is about to pass through the point B, the lane recognition unit 131 recognizes the right-hand lane. Since the road marking on the right-hand lane has not yet been displayed at the point B as illustrated in FIG. 3, the marking information management unit 133 does not update the marking information 171 and leaves the right-hand lane as a lane where the vehicle can travel in all directions as illustrated in FIG. 4.

Next, when the vehicle M is about to pass through the point C, the marking recognition unit 132 acquires information indicating road marking RMc and recognizes the road marking on the driving lane and the road markings on the adjacent lanes (the left-hand lane and the right-hand lane). The marking recognition unit 132 specifies that the permitted travel direction of the driving lane is only the straight-ahead direction, the permitted travel directions of the left-hand lane are the straight-ahead direction and the left turn direction, and the permitted travel directions of the right-hand lane are the straight-ahead direction and the right turn direction on the basis of a result of the recognition. The marking recognition unit 132 outputs information indicating results of the specification to the marking information management unit 133. The marking information management unit 133 acquires information output from the marking recognition unit 132. The marking information management unit 133 causes the storage unit 170 to store the acquired information as the marking information 171.

As illustrated in FIG. 4, the marking information 171 at the point C is updated from the marking information 171 at the point B, in which the permitted travel directions of the left-hand lane are the left turn direction and the straight-ahead direction, the permitted travel direction of the driving lane is only the straight-ahead direction, and the permitted travel direction of the right-hand lane is only the right turn direction. In this manner, the marking information management unit 133 updates the marking information 171 stored in the storage unit 170 every time new road markings are recognized with the travel of the vehicle M.

Figure 5:
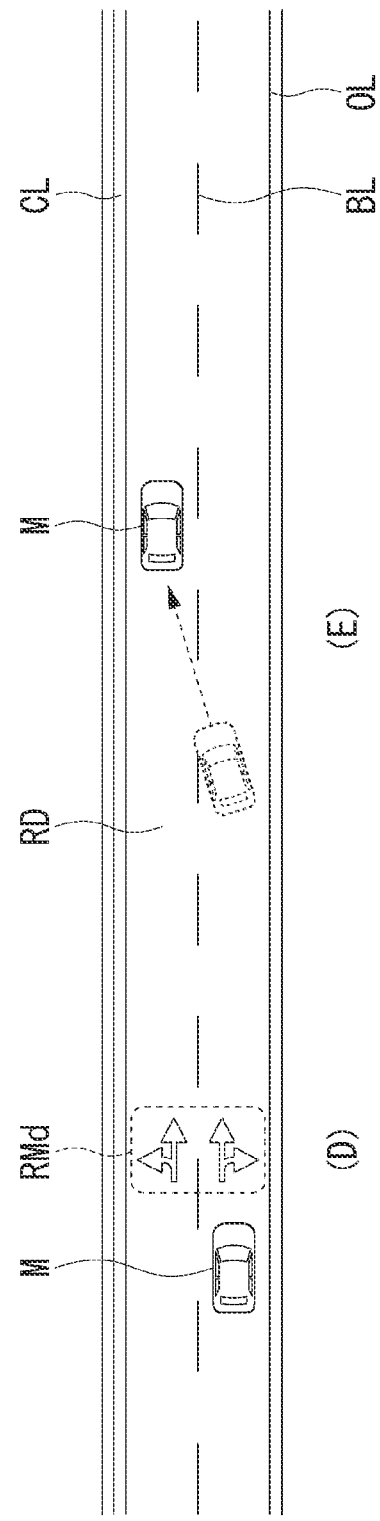
FIG. 5 is a diagram for explaining processing performed by the recognition unit in a first drive assist pattern.

In the first drive assist pattern, the automatic driving control device 100 performs drive assist in accordance with a change in lanes in a case in which the vehicle M changes lanes. FIG. 5 is a diagram for explaining processing performed by the recognition unit 130 in the first drive assist pattern. As illustrated in FIG. 5, the vehicle M passes through the point D where the road marking RMd is displayed and then changes lanes to the left-hand lane at the point E.

When the vehicle M is about to pass through the point D, the marking recognition unit 132 acquires information indicating the road marking RMd and recognizes the road marking on the driving lane and the road marking on the adjacent lane (left-hand lane).

Note that a right-hand lane is not present at the point D, no road markings on a right-hand lane are recognized. The marking recognition unit 132 specifies that the permitted travel directions of the driving lane are the straight-ahead direction and the right turn direction while the permitted travel directions of the left-hand lane are the straight-ahead direction and the left turn direction on the basis of results of the recognition. The marking recognition unit 132 outputs information indicating results of the specification to the marking information management unit 133. The marking information management unit 133 acquires the information output from the marking recognition unit 132. The marking information management unit 133 causes the storage unit 170 to store the acquired information as the marking information 171.

FIG. 6 illustrates, in the form of a table, the marking information 171 stored in the storage unit 170 at the timing at which the vehicle M passes through each point. As illustrated in FIG. 6, according to the marking information 171 at the point D, the permitted travel directions of the left-hand lane are the left turn direction and the straight-ahead direction, and the permitted travel directions of the driving lane are the straight-ahead direction and the right turn direction. Note that since the right-hand lane is not present at the point D as illustrated in FIG. 5, and no road marking is recognized, the permitted travel direction of the right-hand lane has not yet been detected in the marking information 171 at the point D as illustrated in FIG. 6. Note that in a case in which the permitted travel direction has not yet been detected, it is determined that the vehicle can travel in all the directions as described above.

The point E is a point at which the vehicle M has changed lanes to the left-hand lane. The lane change detection unit 134 detects a change in lanes of the vehicle M. If the lane change detection unit 134 detects a change in lanes, then the marking information management unit 133 replaces data such that the marking information 171 stored in the storage unit 170 is slid for each lane. Specifically, the marking information management unit 133 updates the marking information 171 stored in the storage unit 170 such that the permitted travel direction of the lane after the lane change of the vehicle M (the left-hand lane in FIG. 5) is changed to the permitted travel direction of the vehicle M as illustrated in FIG. 6. Also, the marking information management unit 133 updates the marking information 171 stored in the storage unit 170 such that the permitted travel direction of the lane before the lane change of the vehicle M is changed to the permitted travel direction of the lane on the side opposite to the direction to which the lane change has been performed (the right-hand lane in FIG. 5). Note that since the left-hand lane is not present for the driving lane after the change in lanes as illustrated in FIG. 5, the permitted travel direction of the left-hand lane has not yet been detected in the marking information 171 at the point E as illustrated in FIG. 6. Note that in a case in which the permitted travel direction has not yet been detected, it is determined that the vehicle can travel in all the directions as described above.

Note that the marking information management unit 133 may invalidate (or delete) the marking information 171 indicating the permitted travel direction of the lane that has become two lanes away due to the change in lanes. A configuration in which when the vehicle M has changed lanes from the center lane of a three-lane road to one of adjacent lanes (the left-hand lane, for example; a first adjacent lane), for example, the marking information 171 indicating the permitted travel direction of the other adjacent lane (the right-hand lane of the lane before the change in lanes, for example; a second adjacent lane) is invalidated (or deleted) may be employed. It is thus possible to reduce a data storage capacity required for the storage unit 170 and to reduce device cost and the like.

The reset determination unit 135 invalidates (or deletes) all pieces of marking information 171 stored in the storage unit 170 in a case in which a predetermined condition is satisfied. The predetermined condition mentioned here means that at least one of turning right or left of the vehicle M, passing of the vehicle M through an intersection, and travel of the vehicle M by a predetermined distance (a long distance such as 800 [m], for example) after recognition of a road marking, for example, is satisfied. This is because the case in which the aforementioned condition is satisfied is a situation in which the permitted travel direction recognized until then is typically meaningless any more.

In a case in which the vehicle M turns right or left, since the road along which the vehicle M travels is changed, the marking information 171 stored until then is invalidated. Also, since a road marking indicating a permitted travel direction typically indicates a permitted travel direction of each lane until a next intersection, the marking information 171 stored until then is invalidated in a case in which the vehicle M passes through the intersection.

Also, in a case in which the vehicle M has traveled by some distance with no other road marking detected after a road marking is recognized, there is a high probability that a road marking displayed in the course has been missed or passing of an intersection has been missed. Therefore, in the case in which the vehicle M has traveled by a predetermined distance with no next road marking recognized after a road marking is recognized, the marking information 171 stored until then is invalidated.

Figure 7:
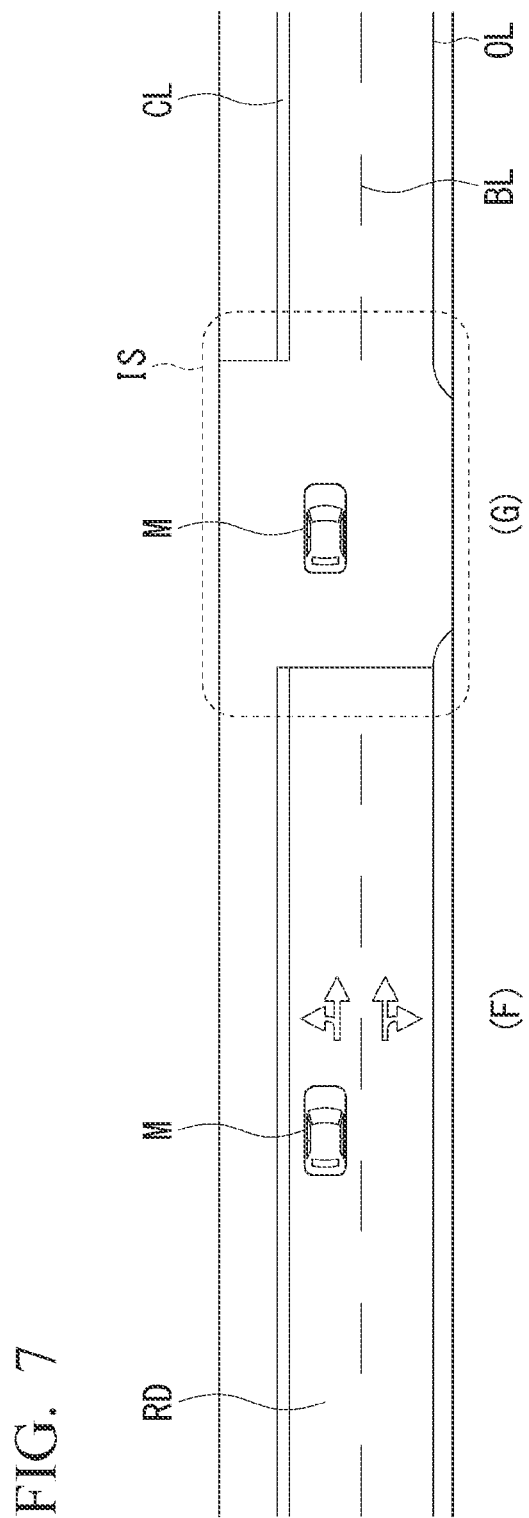
FIG. 7 is a diagram for explaining the processing performed by the recognition unit in the first drive assist pattern.
Figure 8:
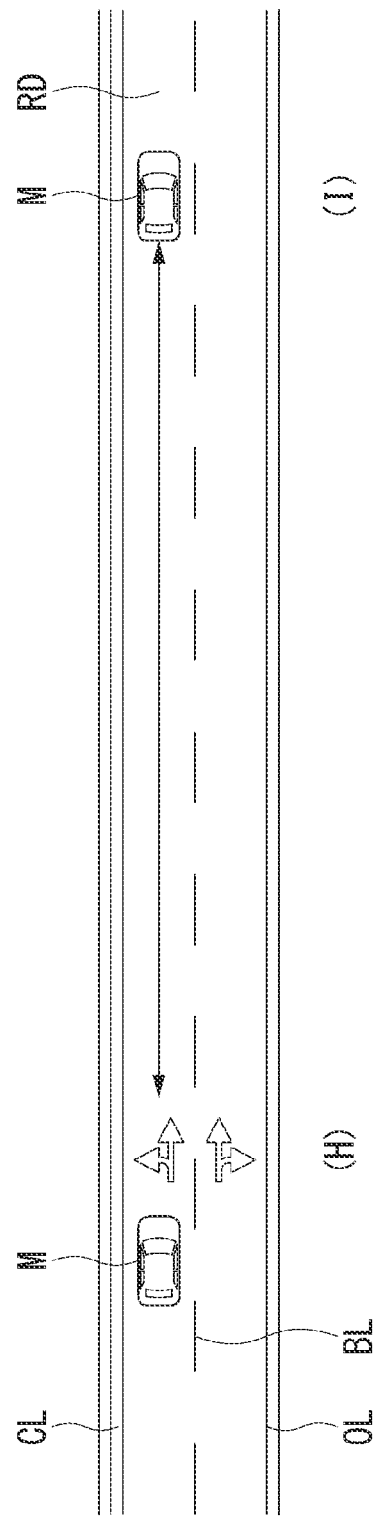
FIG. 8 is a diagram for explaining the processing performed by the recognition unit in the first drive assist pattern.

FIG. 7 is a diagram illustrating a state in which the vehicle M passes through an intersection. The marking recognition unit 132 recognizes a road marking at the point F and causes the storage unit 170 to store the marking information 171. Thereafter, the vehicle M passes through an intersection IS at the point G. Also, FIG. 8 is a diagram illustrating a state in which the vehicle M travels by a predetermined distance after a road marking is recognized. The marking recognition unit 132 recognizes a road marking at the point H and causes the storage unit 170 to store the marking information 171. Thereafter, the vehicle M arrives at the point I separated from the point H by the predetermined distance. Note that the reset determination unit 135 measures the distance by which the vehicle M has traveled after the road marking is recognized.

FIG. 9 illustrates, in the form of a table, the marking information 171 stored in the storage unit 170 at a timing at which the vehicle M passes through each point. In this manner, the reset determination unit 135 invalidates (or deletes) all the pieces of marking information 171 stored in the storage unit 170 after passing through the point G or the point I.

Operations of Automatic Driving Control Device

Figure 10:
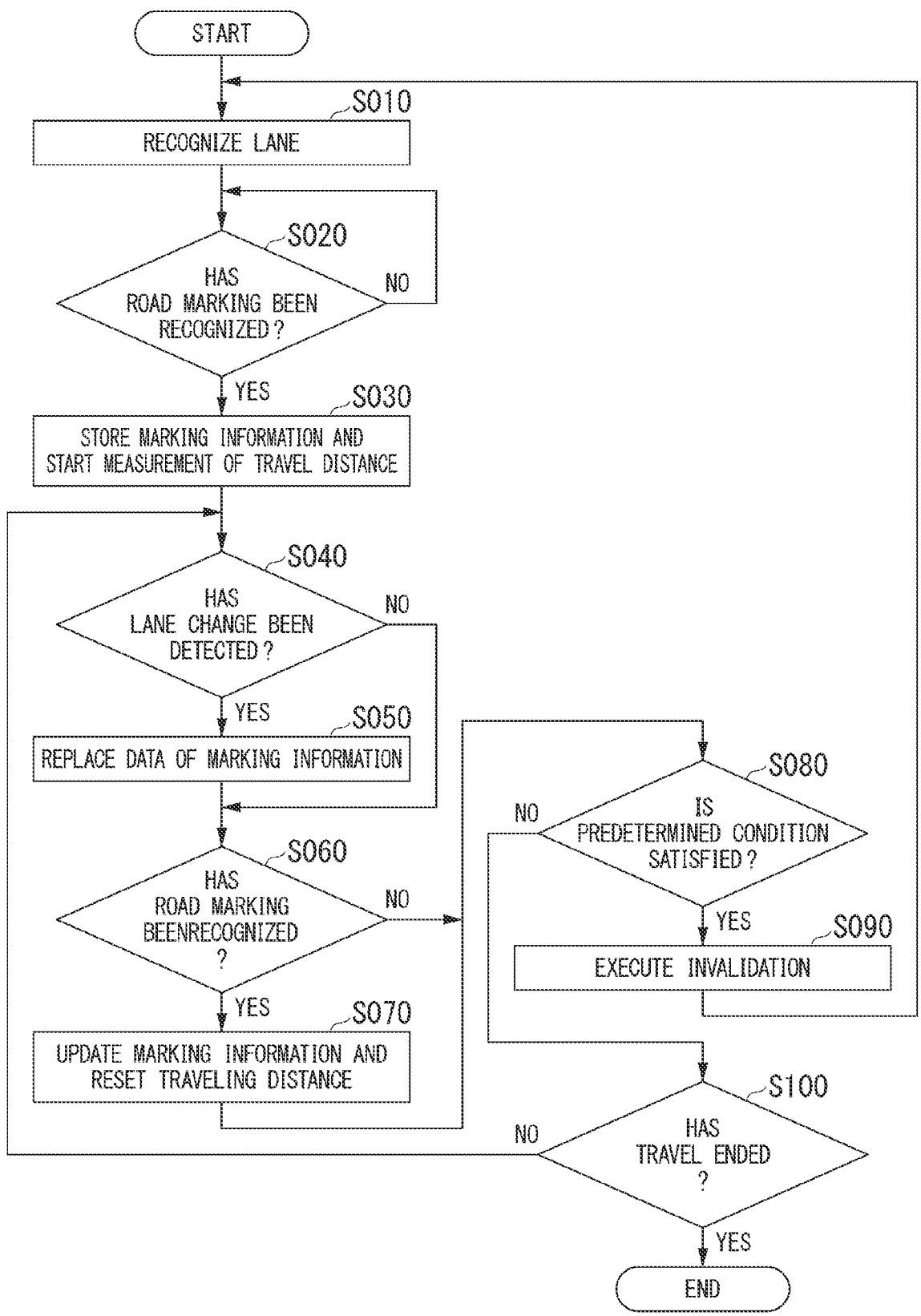
FIG. 10 is a flowchart illustrating an example of a processing flow executed by an automatic driving control device.

Hereinafter, an example of operations of the automatic driving control device 100 will be described. FIG. 10 is a flowchart illustrating operations of the automatic driving control device 100 according to the embodiment of the invention.

The lane recognition unit 131 recognizes the driving lane and the adjacent lanes on the basis of information output from the object recognition device 16 (Step S010). Next, in a case in which the marking recognition unit 132 specifies each of the permitted travel directions of the driving lane and the adjacent lanes on the basis of the road markings displayed on the recognized driving lane and the adjacent lanes (Step S020), the marking information management unit 133 causes the storage unit 170 to store information indicating the specified permitted travel directions as marking information 171. Also, the reset determination unit 135 starts to measure the distance by which the vehicle M has traveled after the road markings are recognized (Step S030).

Next, in a case in which the lane change detection unit 134 detects a change in lanes of the vehicle M (Step S040), the marking information management unit 133 replaces data such that the marking information 171 stored in the storage unit 170 is slid for each lane as illustrated in FIG. 6 (Step S050). Next, in a case in which the marking recognition unit 132 specifies each of the permitted travel directions of the driving lane and the adjacent lanes on the basis of road markings displayed on the recognized driving lane and the adjacent lanes (Step S060), the marking information management unit 133 updates the marking information 171 stored in the storage unit 170 with the information indicating the specified permitted travel directions. Also, the reset determination unit 135 resets the measurement of the distance by which the vehicle M has traveled after the road markings are recognized (Step S070).

In a case in which the predetermined condition is satisfied (Step S080), the reset determination unit 135 executes invalidation (or deletion) of all the pieces of marking information 171 stored in the storage unit 170 (Step S090). The predetermined condition mentioned here means that any one of turning right or left of the vehicle M, passing of the vehicle M through an intersection, and the travel of the vehicle M by a predetermined distance after recognition of a road marking is satisfied, for example, as described above.

The automatic driving control device 100 repeats the aforementioned operations in and after Step S040 until the vehicle M ends travel (step S100). As described hitherto, the operations of the automatic driving control device 100 illustrated in the flowchart in FIG. 10 ends.

As described above, the automatic driving control device 100 according to the embodiment recognizes a road marking of the driving lane and a road marking of one adjacent lane from the image of the pavement captured from the vehicle M. The automatic driving control device 100 specifies the permitted travel direction of the driving lane and the permitted travel direction of the one adjacent lane. The automatic driving control device 100 stores first information indicating the permitted travel direction of the driving lane and second information indicating the permitted travel direction of the one adjacent lane. In a case in which a change in lanes to the one adjacent lane is detected, the automatic driving control device 100 updates the information such that the second information is the permitted travel direction of the driving lane and the first information is the permitted travel direction of the other adjacent lane. As described above, the automatic driving control device 100 may further recognize the permitted travel direction of the other adjacent lane and may further specify the permitted travel direction of the other adjacent lane. In this case, the automatic driving control device 100 further stores, in the storage unit, third information indicating a permitted travel direction of the other adjacent lane. In a case in which a change in lanes to the one adjacent lane is detected, the automatic driving control device 100 invalidates the third information. As described above, in a case in which it is determined that the condition that any of the right or left turning of the vehicle M, passing through an intersection, and travel by a predetermined distance after the permitted travel direction is recognized is performed is satisfied, the automatic driving control device 100 may invalidate the aforementioned stored information indicating the permitted travel direction.

With this configuration, the automatic driving control device 100 can use the second information indicating the permitted travel direction of the adjacent lane that is the lane after the change in lanes as information indicating the permitted travel direction of the driving lane after that time immediately after the change in lanes is performed and can thus perform more appropriate drive assist. For example, the automatic driving control device 100 can provide, to the MPU 60, information indicating the permitted travel direction of each lane after the change in lanes at the timing when the change in lanes is performed.

Second Drive Assist Control Pattern

In a second drive assist pattern, when there is a lane for which the marking recognition unit 132 cannot recognize a road marking, for example, a case in which another vehicle (hereinafter, referred to as "another vehicle") is stopped on the road marking, the marking information management unit 133 does not update the marking information 171 for the lane.

Figure 11:
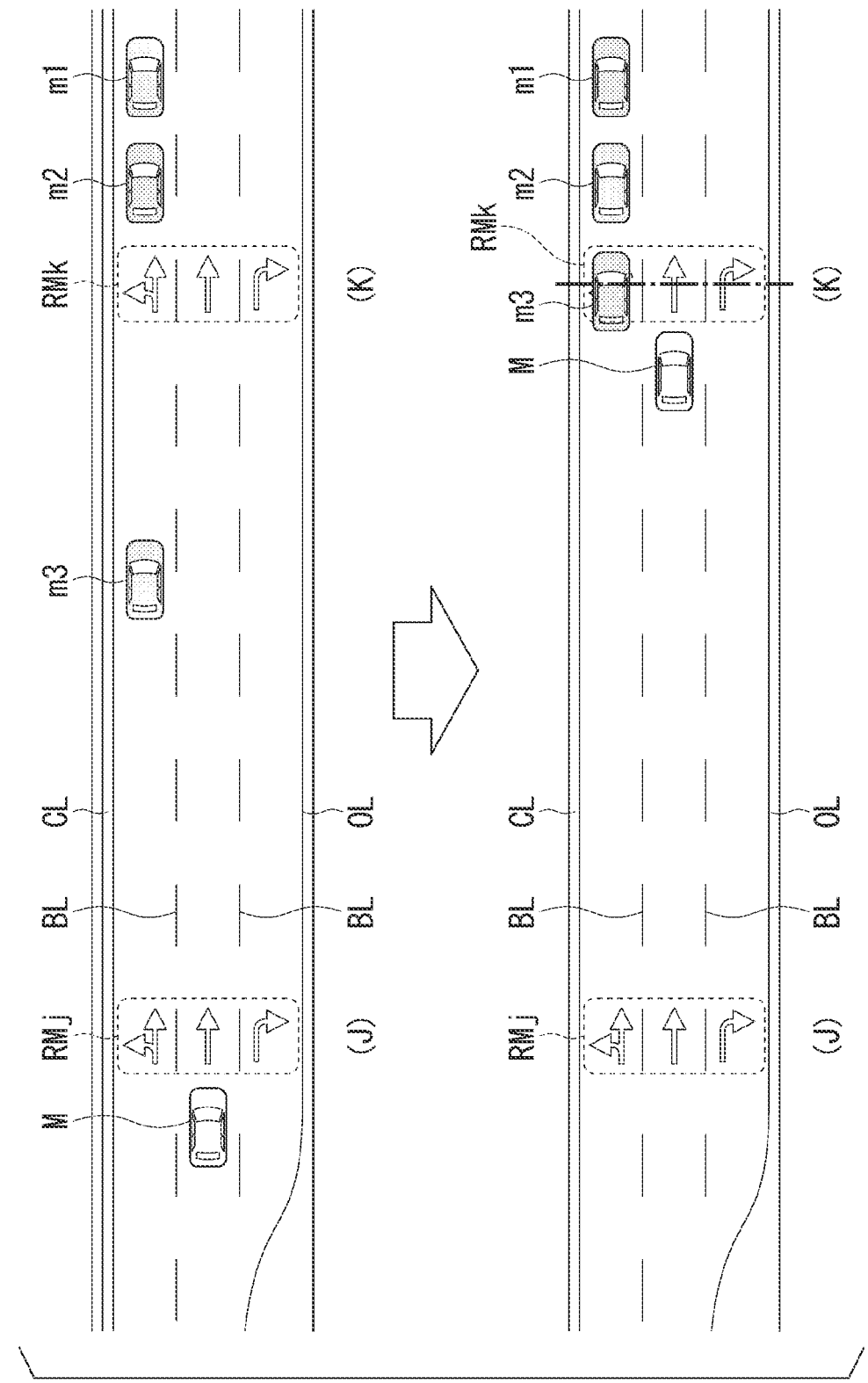
FIG. 11 is a diagram for explaining processing performed by the recognition unit in a second drive assist pattern.

FIG. 11 is a diagram for explaining processing performed by the recognition unit 130 in the second drive assist pattern. FIG. 11 illustrates a road RD, a lane center line CL, two lane boundary lines BL, a lane outer line OL, a road marking RMj displayed at the point J, and a road marking RMIc displayed at the point K. Also, FIG. 11 illustrates the vehicle M that is about to pass through the point J and the point K and each of other vehicles m1 to m3. In other words, FIG. 11 illustrates a state in which the vehicle M travels along the road RD while passing through the point J and the point K in this order.

As illustrated in FIG. 11, a state in which another vehicle m3 travel along the left-hand lane is stopping on the road marking RMk displayed at the point K when the vehicle M is about to pass through the point K after the road marking RMj is recognized when the vehicle M is about to pass through the point J is illustrated. In this manner, the marking recognition unit 132 of the vehicle M cannot recognize the road marking RMk on the left-hand lane and cannot specify the permitted travel direction of the left-hand lane. In such a case, the marking recognition unit 132 does not update the marking information 171 indicating the permitted travel direction of the left-hand lane based on the previous (the last) road marking RMj displayed at the point J and holds the marking information 171 as it is. In other words, the marking recognition unit 132 regards the road marking indicating the straight-ahead direction and the left turn direction that are the permitted travel directions of the left-hand lane based on the road marking RMj displayed at the last point J as being similarly displayed at the point K as well for the left-hand lane. Therefore, the marking information 171 indicating the permitted travel directions of the left-hand lane based on the road marking RMj is not invalidated in response to travel of the vehicle M by the predetermined distance from the point J and can be held until the vehicle M travels by the predetermined distance from the point K.

Note that in a case in which the marking recognition unit 132 recognizes a road marking of at least one lane, the marking recognition unit 132 estimates that road markings are also displayed on the other lanes at the same point. This is because road markings of lanes are typically displayed together at one location in many cases. FIG. 12 illustrates, in the form of a table, the marking information 171 stored in the storage unit 170 at a timing at which the vehicle M passes through each point. As illustrated in FIG. 12, the information indicating the permitted travel directions of the left-hand lane specified at the point J is taken over as permitted travel directions of the left-hand lane at the next point K where the road marking of the left-hand lane has not been recognized.

As described above, the automatic driving control device 100 according to the embodiment does not update the information indicating the permitted travel direction of the lane for which the road marking has not been recognized. The automatic driving control device 100 includes such a configuration, can thus use information indicating the permitted travel direction based on the road marking previously recognized even for the lane for which the road marking has not been recognized, and can thereby perform appropriate drive assist. When there is a lane for which the road marking has not been recognized, for example, the automatic driving control device 100 can provide, to the MPU 60, information indicating the previously recognized permitted travel direction of the lane.

Third Drive Assist Control Pattern

In a third drive assist pattern, the notification control unit 180 provides a notification indicating an alert to the passenger of the vehicle M in a case in which the permitted travel direction based on the marking information 171 stored in the storage unit 170 does not conform to the permitted travel direction indicated by a traffic signal.

Figure 13:
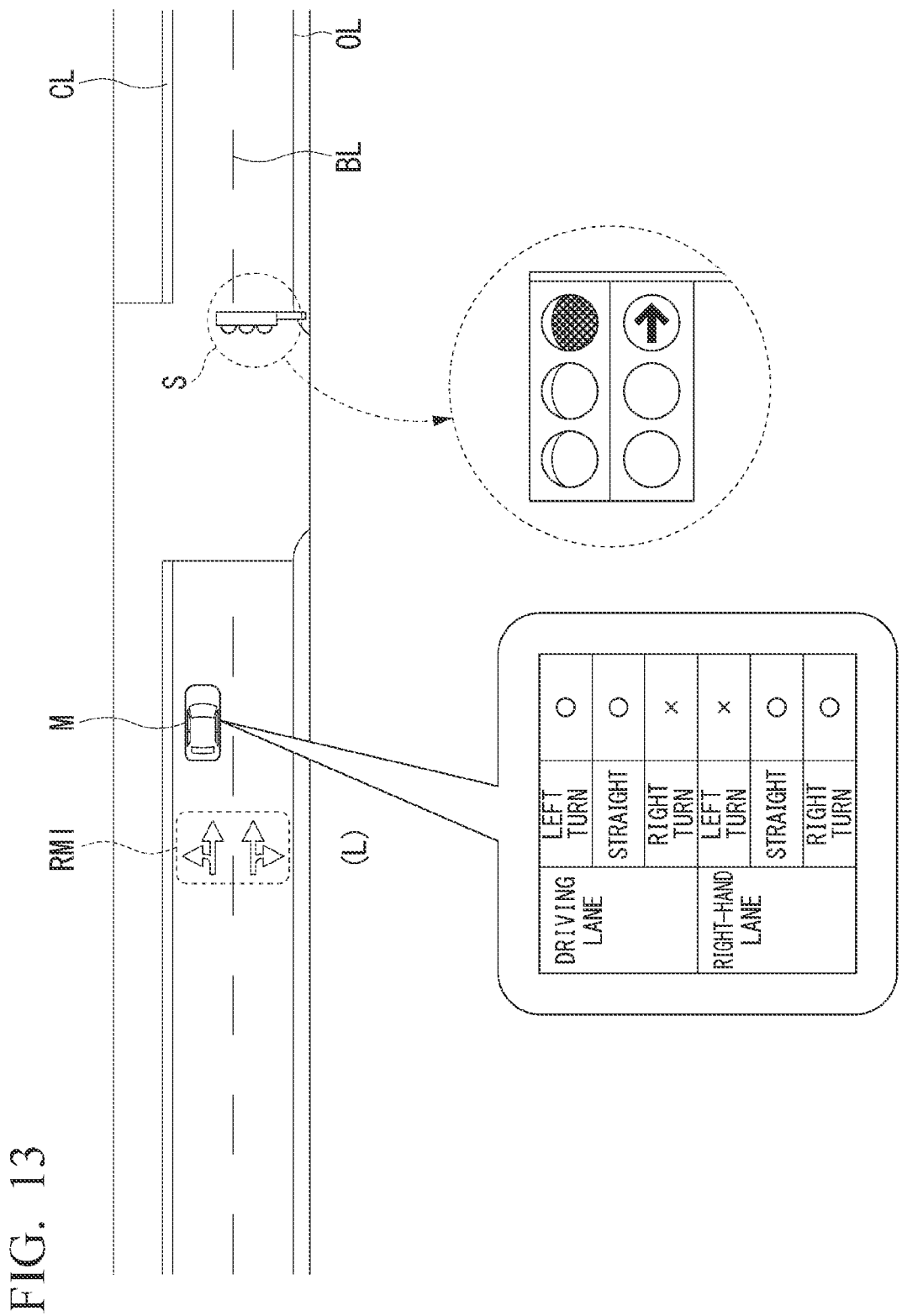
FIG. 13 is a diagram for explaining processing performed by the recognition unit in a third drive assist pattern.

FIG. 13 is a diagram for explaining processing performed by the recognition unit 130 in the third drive assist pattern. FIG. 13 illustrates a road RD, a lane center line CL, a lane boundary line BL, a lane outer line OL, a road marking RM1 displayed at the point L, a traffic signal S, and the vehicle M. FIG. 13 illustrates a state in which the vehicle M travels toward an intersection where the traffic signal S is placed after passing through the point L.

As illustrated in FIG. 13, the permitted travel directions of the driving lane are changed to the straight-ahead direction and the left turn direction according to the marking information 171 stored in the storage unit 170 by the vehicle M passing through the point L. However, the permitted travel direction indicated by the traffic signal S is the right turn direction as illustrated in FIG. 13. In a case in which the permitted travel directions based on the marking information 171 stored in the storage unit 170 do not conform to the permitted travel direction indicated by the traffic signal S in this manner, the notification control unit 180 controls the HMI 30 and provides a notification to the passenger of the vehicle M. Note that as a notification method, any method such as sound notification, a notification based on image display, a notification based on turning-on of an alert lamp, or a notification based on generation of vibration, for example, may be used.

Note that the notification control unit 180 may be configured not to provide a notification in a case in which the permitted travel directions based on the marking information 171 stored in the storage unit 170 and the permitted travel direction indicated by the traffic signal S partially conform to each other. In a case in which the permitted travel directions based on the marking information 171 stored in the storage unit 170 are the straight-ahead direction and the left turn direction and the permitted travel directions indicated by the traffic signal S are the straight-ahead direction and the right turn direction, for example, the fact that the straight-ahead direction is the permitted travel direction is common to the both. In this case, the notification control unit 180 may not provide a notification. This is because there is a probability that the vehicle M plans to travel in the straight-ahead direction and the vehicle M is traveling along a correct lane.

Note that in a case in which the traffic signal S does not include any arrow signal, or in a case in which an arrow signal is not turned on, the notification control unit 180 may determine whether or not to provide a notification using a display state of a three-light signal. In this case, the notification control unit 180 may recognize all the directions as permitted travel directions in a case in which a blue or yellow light of the three-light signal of the traffic signal S is turned on and may recognize that not all the directions are the permitted travel direction in a case in which a red light is turned on, for example.

As described above, the automatic driving control device 100 according to the embodiment recognizes a display state of the traffic signal S and specifies the permitted travel direction. In a case in which the permitted travel direction based on the display state of the traffic signal S and the permitted travel direction of the driving lane stored on the basis of the road marking do not conform to each other, the automatic driving control device 100 provides a notification of the passenger of the vehicle M. Since the automatic driving control device 100 can provide a notification to the passenger using the HMI 30, for example, in a case in which the vehicle M is traveling along a lane that does not match a desired traveling direction, for example, by including such a configuration, it is possible to allow the passenger to recognize a risk in the surroundings in an early stage and to perform more appropriate drive assist.

Fourth Drive Assist Control Pattern

In a fourth drive assist pattern, in a case in which at least one lane line has not yet been detected, the lane interpolation unit 137 interpolates the lane line, which has not been detected, with an estimated (virtual) lane line. In this manner, the lane recognition unit 131 can recognize the lane. Also, the lane interpolation unit 137 appropriately corrects the estimated lane line in response to new recognition of a road marking in a case in which a state where the lane line has not yet been detected has continued.

Figure 14:
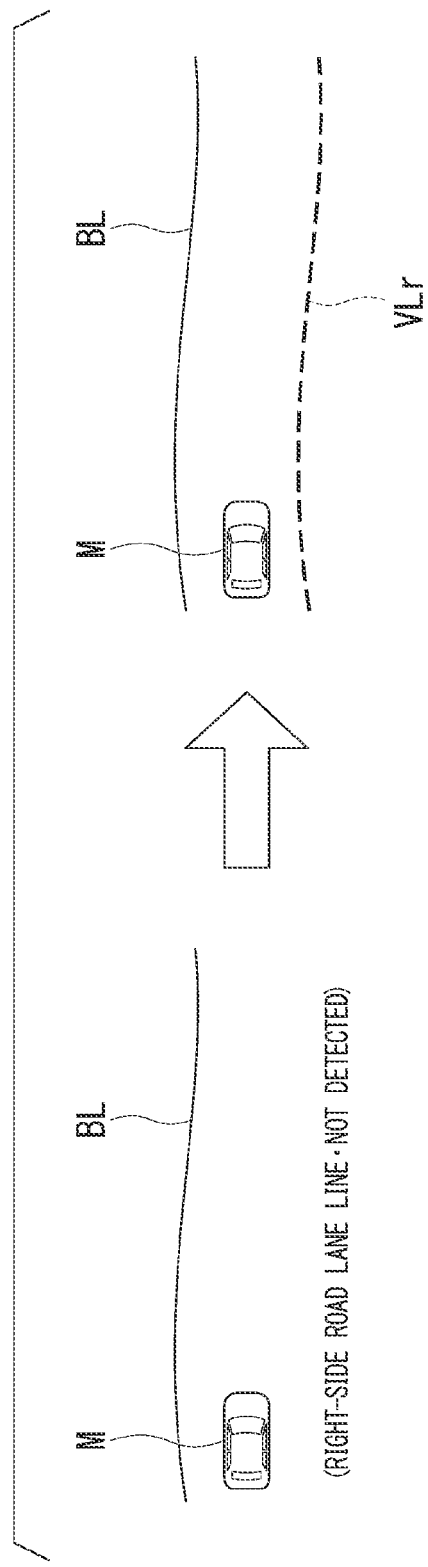
FIG. 14 is a diagram for explaining processing performed by the recognition unit in a fourth drive assist pattern.
Figure 15:
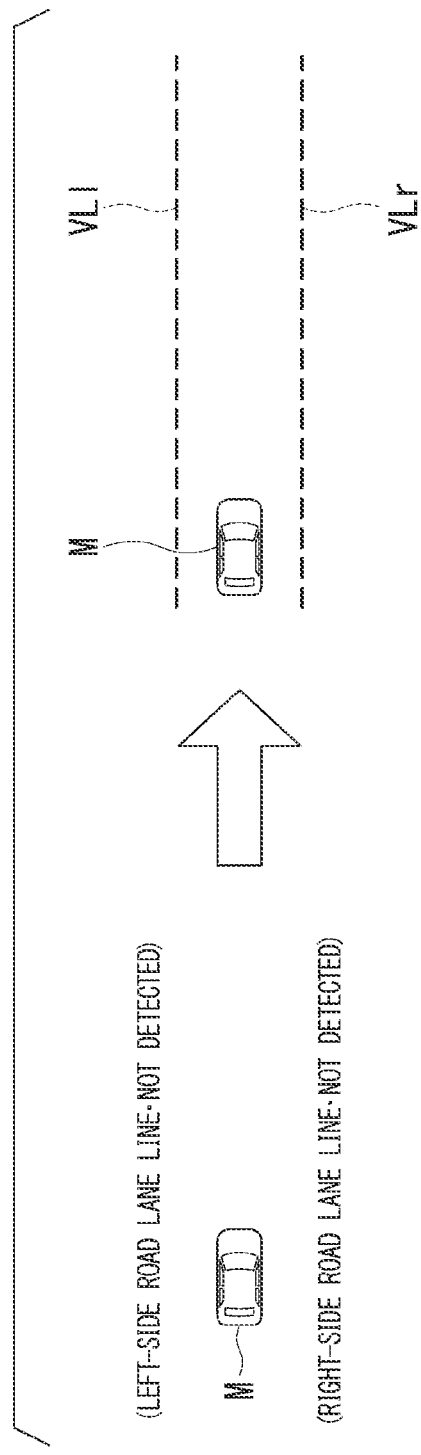
FIG. 15 is a diagram for explaining the processing performed by the recognition unit in the fourth drive assist pattern.
Figure 16:
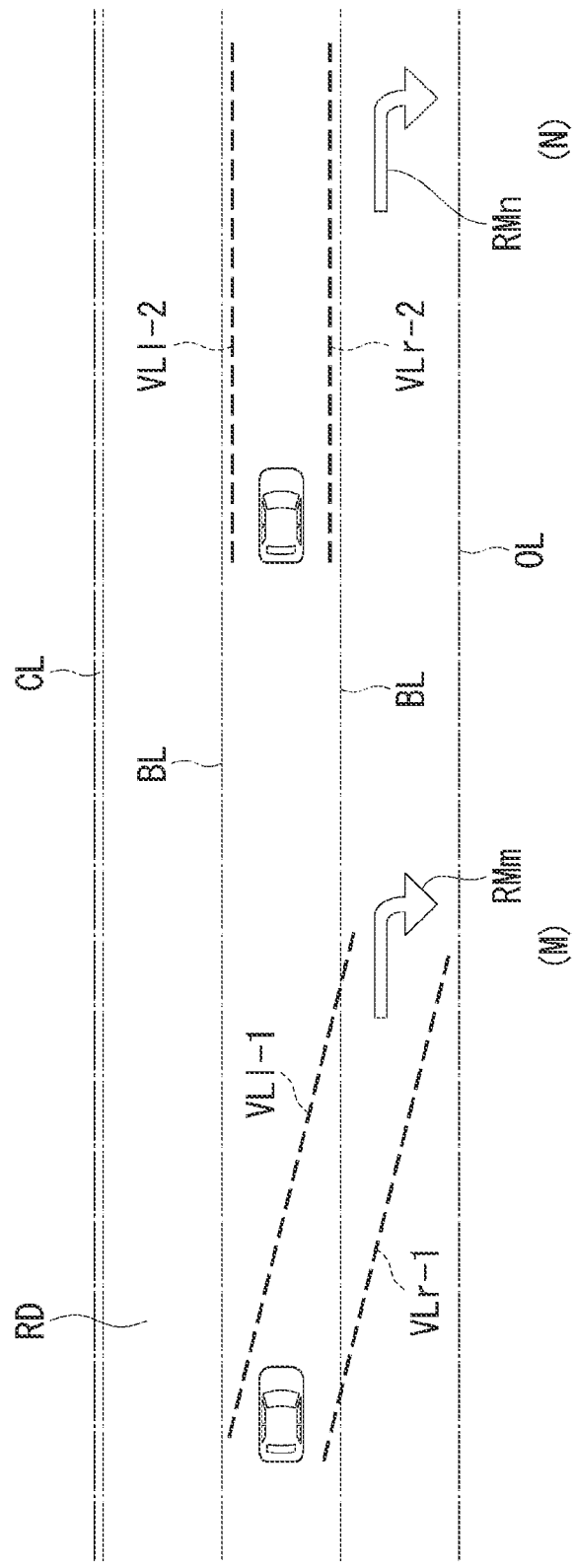
FIG. 16 is a diagram for explaining the processing performed by the recognition unit in the fourth drive assist pattern.

FIGS. 14 to 16 are diagrams for explaining processing performed by the recognition unit 130 in the fourth drive assist pattern. FIG. 14 illustrates a case where a left-side lane line BL of the driving lane along which the vehicle M is traveling has been recognized while a right-side lane line has not been detected. In this case, the lane interpolation unit 137 determines the position of a right-side lane line VLr that is a virtual lane line. The lane interpolation unit 137 determines the position of the right-side lane line VLr on the basis of the distance from the position of the vehicle M to the position of the left-side lane line BL, for example. For example, the lane interpolation unit 137 regards, as the position of the right-side lane line VLr, the position separated on the right side of the travel direction of the vehicle M by the same distance as the distance from the travel line of the vehicle M to the position of the left-side lane line BL. In other words, the lane interpolation unit 137 regards the vehicle M as being traveling at the center of the driving lane, for example.

Also, FIG. 15 illustrates a case where both the left-side lane line and the right-side lane line of the driving lane along which the vehicle M is traveling have not yet been detected. In this case, the lane interpolation unit 137 determines each of the position of the left-side lane line VL1 and the right-side lane line VLr that are virtual lane lines. The lane interpolation unit 137 regards, as the position of the left-side lane line VL1 and the position of the right-side lane line VLr, the positions separated on both sides of the travel direction of the vehicle M by a predetermined distance (2 [m], for example) from the travel line of the vehicle M, for example. In other words, the lane interpolation unit 137 regards that the width of the driving lane as 4 [m] (=2 [m]×2) and regards the vehicle M as being traveling at the center of the driving lane, for example.

FIG. 16 illustrates processing for correcting estimated lane lines. FIG. 16 illustrates a road RD, a lane center line CL, two lane boundary lines BL, a lane outer line OL, a road marking RMm displayed at the point M, and a road marking RMn displayed at the point N. Here, it is assumed that a state in which recognition of the lane center line CL, the two lane boundary lines BL, and the lane outer line OL is difficult due to degradation of painting or snowing, for example has been achieved.

Also, FIG. 16 illustrates each vehicle M that is about to pass through the point M and the point N. In other words, FIG. 3 illustrates a state in which the vehicle M travels along the road RD while passing through the point M and the point N in this order. Also, FIG. 16 illustrates each of a left-side lane line VL1-1 and a right-side lane line VLr-1 estimated by the lane interpolation unit 137 when the vehicle M is about to pass through the point M and a left-side lane line VL-2 and a right-side lane line VLr-2 estimated by the lane interpolation unit 137 when the vehicle M is about to pass through the point N.

As illustrated in FIG. 16, it is assumed that the lane recognition unit 131 has recognized the lane inclined in the right lower direction in the drawing, which is difference from an actual driving lane, as a driving lane from the left-side lane line VL1-1 and the right-side lane line VLr-1 estimated by the lane interpolation unit 137 when the vehicle M is about to pass through the point M. In this manner, the marking recognition unit 132 erroneously recognizes that the road marking RMm is the road marking of the driving lane. However, it is assumed that the lane recognition unit 131 has recognized a lane that is approximate to the actual driving lane as a driving lane from the left-side lane line VL1-2 and the right-side lane line VLr-2 estimated by the lane interpolation unit 137 when the vehicle M is about to pass through the point N next. In this manner, the marking recognition unit 132 recognizes the road marking RMn as a road marking of the adjacent lane on the right side.

At this time, in a case in which the permitted travel direction indicated by the road marking RMm recognized at the point M and the permitted travel direction indicated by the road marking RMn recognized at the point N conform to each other (in other words, the road marking RMm and the road marking RMn are the same road markings), the marking information management unit 133 regards the estimation of the left-side lane line VL1-1 and the right-side lane line VLr-1 at the point M as erroneous estimation and updates the marking information 171 stored in the storage unit 170 to invalidate (delete) the information indicating the permitted travel direction of the driving lane.

Figures 17, 18:
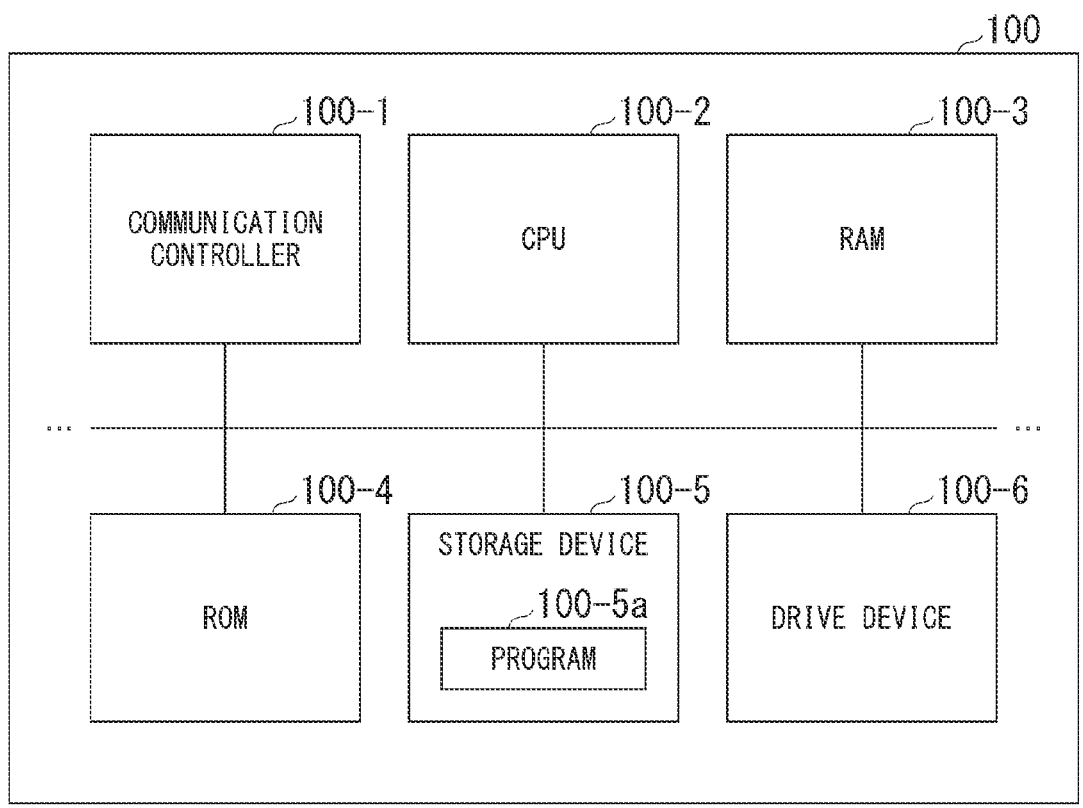
FIG. 17 is a diagram for explaining the processing performed by the recognition unit in the fourth drive assist pattern.
FIG. 18 is a diagram illustrating an example of a hardware configuration of the automatic driving control device according to the embodiment.

FIG. 17 illustrates, in the form of a table, the marking information 171 stored in the storage unit 170 at a timing at which the vehicle M passes through each point. As illustrated in FIG. 17, the marking information management unit 133 invalidates (or deletes), at the point N, the information indicating the permitted travel direction of the driving lane stored in the storage unit 170 at the point M and updates the marking information 171 to achieve a state in which the information has not yet been detected. Note that in a case in which the permitted travel direction has not yet been detected, it is determined that the vehicle M can travel in all the directions as described above. Also, the marking information management unit 133 updates the marking information 171 to update the information indicating the permitted travel direction of the right-hand lane on the basis of the road marking RMn recognized at the point N.

As described above, the automatic driving control device 100 according to the embodiment specifies the driving lane and the adjacent lanes on the basis of the lane lines recognized from an image, and in a case in which there is a lane line that has not been recognized, the automatic driving control device 100 interpolates the lane line which has not yet been detected with a virtual lane line estimated with reference to the travel direction of the vehicle M. The automatic driving control device 100 can estimate the driving lane and the adjacent lanes, use the information indicating the permitted travel directions even in the case in which the lane lines cannot accurately be recognized, and thus perform more appropriate drive assist, by including such a configuration. Even in a case in which the lane lines are not recognized, for example, the automatic driving control device 100 can estimate the lanes based on the virtual lane line and provide information indicating the permitted travel direction of the estimated lane to the MPU 60.

Also, in a case in which the permitted travel direction of the driving lane specified on the basis of the lane line estimated with reference to the travel direction of the vehicle M and the permitted travel direction of the adjacent lanes based on the road marking recognized from a new image conform to each other when control of the vehicle M is performed on the basis of the virtual lane line, the automatic driving control device 100 invalidates the information indicating the permitted travel direction of the driving lane and updates the information indicating the permitted travel direction of the adjacent lane. With such a configuration, the automatic driving control device 100 can further enhance estimation accuracy of the lane in response to recognition of road markings with travel of the vehicle M, correct information indicating the permitted travel direction of the driving lane, and thus perform more appropriate drive assist.

Hardware Configuration

FIG. 18 is a diagram illustrating an example of a hardware configuration of the automatic driving control device 100 according to the embodiment. As illustrated the drawing, the automatic driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory and a hard disk drive (HDD), a drive device 100-6, and the like are connected to each other via an internal bus or a dedicated communication line. The communication controller 100-1 performs communication with components other than the automatic driving control device 100. The storage device 100-5 stores a program 100-5a executed by the CPU 100-2. The program is developed in the RAM 100-3 by a direct memory access (DMA) controller (not illustrated) or the like and is executed by the CPU 100-2. In this manner, some or all of the first control unit 120, the second control unit 160, and the notification control unit 180 are realized.

The aforementioned embodiments can be expressed as follows.

A drive assist device including:
a storage device configured to store a program; and
a hardware processor to
recognize a road marking on a driving lane and a road marking on one adjacent lane from an image of a pavement captured from a vehicle and specify a permitted travel direction of the driving lane and a permitted travel direction of the one adjacent lane;
detect a change in lanes performed by the vehicle; and
cause a storage unit to store first information indicating the permitted travel direction of the driving lane and second information indicating the permitted travel direction of the one adjacent lane, and in a case in which the change in lanes to the one adjacent lane is detected, update the information stored in the storage unit to change the second information as the permitted travel direction of the driving lane and the first information as the permitted travel direction of the other adjacent lane.

Although an implementation of the invention has been described using the embodiment, the invention is not limited to such an embodiment at all, and various modifications and replacements can be made without departing from the gist of the invention.

What is claimed is:

1. A drive assist device comprising:
at least one processor configured to:
recognize a road marking on a driving lane and a road marking on a first adjacent lane from an image of a pavement captured from a vehicle and specify a permitted travel direction of the driving lane and a permitted travel direction of the first adjacent lane;
detect a lane change performed by the vehicle;
store, to a memory, first information indicating the permitted travel direction of the driving lane and second information indicating the permitted travel direction of the first adjacent lane, and in response to detecting the lane change to the first adjacent lane, change the second information as the permitted travel direction of the driving lane and update the first information as the permitted travel direction of a second adjacent lane,
recognize a display state of a traffic signal and specify the permitted travel direction; and
provide a notification to a passenger of the vehicle in a case in which the permitted travel direction does not conform to the permitted travel direction of the driving lane based on the information stored in the memory.

2. The drive assist device according to claim 1,
wherein the one or more processor is further configured to recognize a permitted travel direction of the second adjacent lane and further specify the permitted travel direction of the second adjacent lane, and
store, to the memory, third information indicating the permitted travel direction of the second adjacent lane, and in response to detecting the lane change to the first adjacent lane, invalidate the third information.

3. The drive assist device according to claim 1,
wherein in response to detecting a lane associated with no road marking, determining the permitted travel direction of the lane associated with no road marking as being in the permitted travel direction based on information stored as the first information and the second information, wherein the first information and the second information has been obtained immediately before the detecting of the lane associated with no road marking and determining a road marking indicating the permitted travel direction of the lane associated with no marking as having been recognized at a point where the road marking of the lane associated with no marking had not been recognized.

4. The drive assist device according to claim 1, wherein the one or more processor is further configured to:
determine whether or not a condition representing at least one of making a right turn or a left turn, passing through an intersection, or travelling a predetermined distance after recognizing the permitted travel direction by the vehicle is satisfied,
wherein, in response to determining that the condition is satisfied, invalidating the first information and the second information.

5. The drive assist device according to claim 1, wherein the one or more processors are further configured to:
specify the driving lane and the adjacent lane based on a lane line recognized from the image; and
interpolate the lane line that has not been recognized, if any, with a lane line estimated with reference to a travel direction of the vehicle.

6. The drive assist device according to claim 5,
wherein in a case in which the permitted travel direction of the driving lane specified based on the estimated lane line conforms to a permitted travel direction of the adjacent lane based on a road marking recognized from a new image, the one or more processors are configured to invalidate the information indicating the permitted travel direction of the driving lane.

7. A drive assist method comprising, by a computer comprising at least one processor:
recognizing a road marking on a driving lane and a road marking on a first adjacent lane from an image of a pavement captured from a vehicle and specifying a permitted travel direction of the driving lane and a permitted travel direction of the first adjacent lane;
detecting a lane change performed by the vehicle;
storing, to a memory, first information indicating the permitted travel direction of the driving lane and second information indicating the permitted travel direction of the first adjacent lane, and in response to detecting the lane change to the first adjacent lane, change the second information as the permitted travel direction of the driving lane and update the first information as the permitted travel direction of a second adjacent lane;
recognizing a display state of a traffic signal and specifying the permitted travel direction; and
providing a notification to a passenger of the vehicle in a case in which the permitted travel direction does not conform to the permitted travel direction of the driving lane based on the information stored in the memory.

8. A computer-readable non-transitory recording medium including a program that causes a computer to:
recognize a road marking on a driving lane and a road marking on a first adjacent lane from an image of a pavement captured from a vehicle and specify a permitted travel direction of the driving lane and a permitted travel direction of the first adjacent lane;
detect a lane change performed by the vehicle;
store, to a memory, first information indicating the permitted travel direction of the driving lane and second information indicating the permitted travel direction of the first adjacent lane, and in response to detecting the lane change to the first adjacent lane, change the second information as the permitted travel direction of the driving lane and update the first information as the permitted travel direction of a second adjacent lane;
recognize a display state of a traffic signal and specify the permitted travel direction; and
provide a notification to a passenger of the vehicle in a case in which the permitted travel direction does not conform to the permitted travel direction of the driving lane based on the information stored in the memory.

* * * * *